US012744140B2

(12) United States Patent
Chen et al.

(10) Patent No.: US 12,744,140 B2
(45) Date of Patent: Sep. 22, 2026

(54) MULTIFFEROIC R-TYPE HEXAFERRITE, A COMPOSITE AND AN ARTICLE COMPRISING THE R-TYPE HEXAFERRITE, AND A METHOD OF MAKING THE SAME

(71) Applicant: ROGERS CORPORATION, Chandler, AZ (US)

(72) Inventors: Yajie Chen, Chandler, AZ (US); Qifan Li, Burlington, MA (US)

(73) Assignee: ROGERS CORPORATION, Chandler, AZ (US)

( * ) Notice: Subject to any disclaimer, the term of this patent is extended or adjusted under 35 U.S.C. 154(b) by 610 days.

(21) Appl. No.: 18/023,168

(22) PCT Filed: Aug. 25, 2021

(86) PCT No.: PCT/US2021/047458
§ 371 (c)(1),
(2) Date: Feb. 24, 2023

(87) PCT Pub. No.: WO2022/046843
PCT Pub. Date: Mar. 3, 2022

(65) Prior Publication Data
US 2023/0352222 A1 Nov. 2, 2023

Related U.S. Application Data

(60) Provisional application No. 63/072,349, filed on Aug. 31, 2020.

(51) Int. Cl.
*H01F 1/34* (2006.01)
*C01G 51/66* (2025.01)
(Continued)

(52) U.S. Cl.
CPC ............ *H01F 1/344* (2013.01); *C01G 51/66* (2013.01); *C08K 3/22* (2013.01); *C01P 2002/54* (2013.01);
(Continued)

(58) Field of Classification Search
CPC . H01F 1/344; H01F 1/348; H01F 1/36; H01F 1/37; H01F 1/34; C04B 35/62615;
(Continued)

(56) References Cited

U.S. PATENT DOCUMENTS 2,960,471 A 11/1960 Willem
4,664,831 A 5/1987 Hibst et al.
(Continued)

FOREIGN PATENT DOCUMENTS

CN 101104556 1/2008
CN 102408202 A 4/2012
(Continued)

OTHER PUBLICATIONS

Wikipedia, Hexagonal ferrites (https://en.wikipedia.org/wiki/Hexagonal_ferrite) (Year: 2025).*
(Continued)

*Primary Examiner* — Matthew E. Hoban
*Assistant Examiner* — Lynne Edmondson
(74) *Attorney, Agent, or Firm* — CANTOR COLBURN LLP

(57) ABSTRACT

In an aspect, an R-type ferrite has the formula: $Me'_3Me_2TiFe_{12}O_{25}$, wherein Me' is at least one of $Ba^{2+}$ or $Sr^{2+}$ and Me is at least one of $Co^{2+}$, $Mg^{2+}$, $Cu^{2+}$, or $Zn^{2+}$. In another aspect, a composite or an article comprises the R-type ferrite. In yet another aspect, a method of making a R-type ferrite comprises milling ferrite precursor compounds comprising oxides of at least Fe, Ti, Me, and Me', to form an oxide mixture; wherein Me' comprises at least one
(Continued)

of $Ba^{2+}$ or $Sr^{2+}$; Me is at least one of $Co^{2+}$, $Mg^{2+}$, $Cu^{2+}$, or $Zn^{2+}$; and calcining the oxide mixture in an oxygen or air atmosphere to form the R-type ferrite.

20 Claims, 6 Drawing Sheets

(51) Int. Cl.

| | |
|---|---|
| ***C04B 35/26*** | (2006.01) |
| ***C04B 35/626*** | (2006.01) |
| ***C08K 3/22*** | (2006.01) |
| ***H01F 1/37*** | (2006.01) |

(52) U.S. Cl.

CPC ...... *C01P 2002/72* (2013.01); *C01P 2006/42* (2013.01); *C08K 2003/2289* (2013.01); *C08K 2201/01* (2013.01)

(58) Field of Classification Search

CPC ............ C04B 35/6262; C04B 35/2633; C04B 35/2683; C04B 35/2625; C04B 2235/3213; C04B 2235/3215; C04B 2235/3232; C04B 2235/3275; C04B 2235/5436; C04B 2235/5445; C01P 2006/42

See application file for complete search history.

(56) References Cited

U.S. PATENT DOCUMENTS

| | | | | |
|---|---|---|---|---|
| 5,452,167 | A | 9/1995 | Nago | |
| 6,358,432 | B1 | 3/2002 | Tomono et al. | |
| 8,263,224 | B2 | 9/2012 | Tokiwa | |
| 10,468,169 | B2 | 11/2019 | Chen et al. | |
| 2002/0039667 | A1 | 4/2002 | Takaya et al. | |
| 2002/0050309 | A1 | 5/2002 | Marusawa | |
| 2003/0052298 | A1 | 3/2003 | Wang et al. | |
| 2003/0091841 | A1 | 5/2003 | Marusawa | |
| 2004/0069969 | A1 | 4/2004 | Endo et al. | |
| 2005/0123743 | A1* | 6/2005 | Martinazzo ............ | C09D 5/033 106/456 |
| 2008/0149882 | A1* | 6/2008 | Terazono ............ | C04B 35/2633 252/62.63 |
| 2012/0085963 | A1 | 4/2012 | An et al. | |
| 2012/0229354 | A1 | 9/2012 | Ishikura et al. | |
| 2013/0115160 | A1 | 5/2013 | Hill et al. | |
| 2014/0291571 | A1 | 10/2014 | Riden | |
| 2018/0016157 | A1 | 1/2018 | Chen et al. | |
| 2019/0318858 | A1 | 10/2019 | Chen et al. | |
| 2021/0032121 | A1 | 2/2021 | Li et al. | |
| 2021/0179442 | A1 | 6/2021 | Chen et al. | |
| 2021/0225566 | A1 | 7/2021 | Zhang et al. | |
| 2021/0246046 | A1 | 8/2021 | Chen et al. | |
| 2023/0352221 | A1 | 11/2023 | Chen et al. | |
| 2023/0352223 | A1 | 11/2023 | Chen et al. | |
| 2023/0399237 | A1 | 12/2023 | Chen et al. | |
| 2024/0158302 | A1 | 5/2024 | Chen et al. | |
| 2024/0203624 | A1 | 6/2024 | Chen et al. | |

FOREIGN PATENT DOCUMENTS

| | | | |
|---|---|---|---|
| CN | 103304186 | A | 9/2013 |
| CN | 104193224 | A | 12/2014 |
| CN | 104379537 | A | 2/2015 |
| DE | 3907220 | | 9/1990 |
| EP | 2028663 | A1 | 2/2009 |
| EP | 2784044 | A1 | 10/2014 |
| EP | 3012843 | A1 | 4/2016 |
| JP | S621149 | A | 1/1987 |
| JP | S6245005 | A | 2/1987 |
| JP | S62216922 | A | 9/1987 |
| JP | S6489504 | A | 4/1989 |
| JP | H02-120237 | A | 5/1990 |
| JP | H05101930 | A | 4/1993 |
| JP | H0615411 | B2 | 3/1994 |
| JP | H06338410 | A | 12/1994 |
| JP | 2000235916 | A | 8/2000 |
| JP | 2001085210 | A | 3/2001 |
| JP | 2008169378 | A | 7/2008 |
| JP | 2009105365 | A | 5/2009 |
| JP | 2010109056 | A | 5/2010 |
| JP | 2015191935 | A | 11/2015 |
| JP | 2017037999 | A | 2/2017 |
| WO | 9600454 | A1 | 1/1996 |
| WO | 2011081399 | A2 | 7/2011 |
| WO | 2012103020 | A2 | 8/2012 |
| WO | 2016123598 | A1 | 8/2016 |
| WO | 2020162295 | A1 | 8/2020 |
| WO | 2021061599 | A1 | 4/2021 |
| WO | 2021162886 | A1 | 8/2021 |

OTHER PUBLICATIONS

Faouri et al., "High quality factor cold sintered Li2MoO4-BaFe12O19 composites for microwave applications," Mar. 2019, Acta Materialia, vol. 166, pp. 202-207.

Li, Qifan, et al. "Emerging magnetodielectric materials for 5G communications: 18H hexaferrites," Acta Materialia 231 (2022) 117854 Elsevier Ltd., 10 pages.

Li, Jie, et al. "Structural and magnetic properties of M-Ti (M=Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Lui, Chaocheng, et al. "Characterizations of magnetic transition behavior and electromagnetic properties of Co-Ti co-substituted SrM-based hexaferrites SrCoxTixFe12-2xO19 compounds," Journal of Alloys and Compounds, vol. 784, Jan. 11, 2019, pp. 1175-1186.

Kim, H., et al. "Epitaxial growth of Zn2Y ferrite films by pulsed laser deposition," Journal of Vacuum Science, American Institute of Physics, 2 Huntington Quadrangle, Melville, NY 11747; vol. 17; No. 5; Sep. 1999; pp. 3111-3114.

Mahmood, Sami H., et al. "Modification of the Magnetic Properties of Co<sub>2</sub>Y Hexaferrites by Divalent and Trivalent Metal Substitutions," Solid State Phenomena, vol. 241; Oct. 2015, pp. 93-125.

International Search Report (ISA/EPO) mailed on Jan. 5, 2022 in International PCT Application No. PCT/US2021/047458 filed Aug. 25, 2021.

Written Opinion (ISA/EPO) mailed on Jan. 5, 2022 in International PCT Application No. PCT/US2021/047458 filed Aug. 25, 2021.

Carvalheiras et al. "Synthesis of red mud derived M-type barium hexaferrites with tuneable coercivity", Ceramics International, vol. 46, No. 5, Nov. 7, 2019, pp. 5757-5764, XP086001988.

Li, Qifan. Development of Magnetodielectric Materials with Low Loss and High Snoek's Product for Microwave Applications, Ph.D. Dissertation to The Department of Electrical and Computer Engineering, Northeastern Univ., Boston, MA, Dec. 2020, 150 pgs.

You, Jae-Hyoung, et al. Magnetic Properties of Zn-substituted Y-type hexaferrites, Ba2ZnxFe2-xFe12O22, Journal of Magnetism and Magnetic Materials, 471 (2019) 255-261.

Guo, Li, et al. "Low temperature co-fired Co2Z barium-strontium ferrite materials with BBSC glass" J Mater Sci: Mater Electron, vol. 27, pp. 2841-2845, Nov. 26, 2015.

Wang, Yu, et al. "Study on Microwave Performance of Low-Temperature Sintered, Ba(CoTi)1.5Fe9O19 Ferrite for Application at UHF Frequency" J Supercon Nov Magn, vol. 31, pp. 455-461, Jul. 6, 2017.

Kohn, J.A. and Eckart, D.W. "Cell, Symmetry and Basic Structure of a New Ferrimagnet," Mat. Res. Bull., vol. 6, pp. 743-748, 1971.

Lee et al., "Low Loss Co2Z (Ba3Co2Fe24O41)—Glass Composite for Gigahertz Antenna Application," Journal of Applies Physics, 2011, vol. 109, 07E530-2.

(56) References Cited

OTHER PUBLICATIONS

Li et al; "Static and Dynamic Magnetic Properties of Co2Z Barium Ferrite Nanoparticle Composites"; Journal of Materials Science, 40, pp. 719-723 (2005).
Pasko et al. "Magnetic and Structural characterization of nanosized BaCoxZn2-xFe16O27 hexaferrite in the vicinity of spin reorientation transition," 2011, Journal of Physics: Conference Series 303.
Pullar, Robert C. "Hexagonal Ferrites: A Review of the synthesis, properties and application of hexaferrite ceramics," Mar. 2012, Progress in Material Science, vol. 57, No. 7, pp. 1191-1334.
Savage, R. O. et al., "Magnetic Properties of Single Crystal CuNi-18H and MgZn-18H Solid Solutions", AIP Conference Proceedings (1975). vol. 24, pp. 491-492, doi.org/10.1063/1.29974.
Singh et al. "Static Magnetic Properties of Co and Ru substituted Ba-Sr ferrite," 2008, Materials Research Bulletin, pp. 176-184, vol. 43.
Tauber, A. et al., "Magnetic Properties of a Unique 18-Layer Hexagonal Ferrite", Journal of Applied Physics 42, 1738 (1971); https://doi.org/10.1063/1.1660419; Published Online: Dec. 19, 2003; 4 pages; https://doi.org/10.1063/1.1660419.
Tauber, A. et al., "Magnetic Properties of Single Crystal Ba5Me2Ti3Fe12O31, ME=Co, Cu", AIP Conference Proceedings (1972) 5(1):1547-1551 ; https://doi.org/10.1063/1.2953911.
Watanabe Kazuya et al., "Discovery of the New Crystallographic Phase of an Exotic Magnetic Oxide: 118H-type Hexaferrite," Journal of the physical society of Japan, Jan. 15, 2020, vol. 89, No. 1, p. 014704.
Shigemura, Synthesis of non-magnetic-ion substituted Ca-based M-type ferrite, Journal of the Magnetics Society of Japan, 2017, vol. 41, Issue 5, pp. 94-98, Released on J-STAGE Sep. 1, 2017 (Year: 2017).
Vu, Hung, et al. "CuO-based sintering aids for low temperature sintering of BaFe12O19 ceramics" Journal of Asian Ceramic Societies, vol. 1 (2013) 170-177, May 23, 2013.

* cited by examiner

MULTIFFEROIC R-TYPE HEXAFERRITE, A COMPOSITE AND AN ARTICLE COMPRISING THE R-TYPE HEXAFERRITE, AND A METHOD OF MAKING THE SAME

CROSS-REFERENCE TO RELATED APPLICATIONS

This application is a National Stage application of PCT/US2021/047458, filed Aug. 25, 2021, which claims the benefit of U.S. Provisional Patent Application Ser. No. 63/072,349 filed Aug. 31, 2020. The related applications are incorporated herein in its their entirety by reference.

FIELD OF INVENTION

The disclosure is directed to a novel multiferroic R-type hexaferrite.

BACKGROUND

Multiferroic materials are materials that inherently exhibit both magnetic and electric polarization. Interest in multiferroic materials has increased over the last twenty years due to developments in the production ability of both single-crystalline samples and high-quality thin-films, as well as in improved computational techniques that have enhanced the understanding of the factors promoting coupling between the magnetic and ferroelectric order parameters. The most widely studied multiferroic material is bismuth ferrite ($BiFeO_3$). Here, the iron atoms move off-center to form the electric dipole moment providing the ferroelectricity, while the bismuth atoms carry the magnetic moment. Other multiferroic materials provide a 'geometrically driven' ferroelectricity such as $YMnO_3$ and multiferroic materials such as $TbMnO_3$ induce multiferroicity by formation of a symmetry-lowering magnetic ground state that lacks inversion symmetry.

While much research has been performed in advancing multiferroic materials, they generally display weak performance at room temperature and are not available for use in microwave applications. Improved multiferroic materials are therefore desired.

BRIEF SUMMARY

Disclosed herein is a multiferroic R-type hexaferrite.

In an aspect, an R-type ferrite has the formula: $Me'_3Me_2TiFe_{12}O_{25}$, wherein Me' is at least one of $Ba^{2+}$ or $Sr^{2+}$ and Me is at least one of $Co^{2+}$, $Mg^{2+}$, $Cu^{2+}$, or $Zn^{2+}$.

In another aspect, a composite or an article comprises the R-type ferrite.

In yet another aspect, a method of making a R-type ferrite comprises milling ferrite precursor compounds comprising oxides of at least Fe, Ti, Me, and Me', to form an oxide mixture; wherein Me' comprises at least one of $Ba^{2+}$ or $Sr^{2+}$; Me is at least one of $Co^{2+}$, $Mg^{2+}$, $Cu^{2+}$, or $Zn^{2+}$; and calcining the oxide mixture in an oxygen or air atmosphere to form the R-type ferrite.

The above described and other features are exemplified by the following figures, detailed description, and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$). While many of these hexaferrites exhibit strong magnetic properties, they are generally not strongly multiferroic in that they do not also display ferroelectric ordering.

A novel multiferroic R-type hexaferrite (herein also referred to as R-type ferrite for simplicity) was developed that displays both magnetic and ferroelectric properties at room temperature of about 23 degrees Celsius (° C.). The R-type ferrite has the formula:

$$Me'_3Me_2TiFe_{12}O_{25}$$

wherein Me' is at least one of $Ba^{2+}$ or $Sr^{2+}$ and Me is at least one of $Co^{2+}$, $Mg^{2+}$, $Cu^{2+}$, or $Zn^{2+}$. Me' can be Ba such that the R-type ferrite has the formula:

$$Ba_3Co_{2-x}Me''_xTiFe_{12}O_{25}$$

wherein Me'' is at least one of $Mg^{2+}$, $Cu^{2+}$, or $Zn^{2+}$ and x is 0 to 2, or 0 to less than 2. The R-type ferrite has an in-plane easy magnetization or cone structure magnetization.

Without intending to be bound by theory, it is believed that the disclosed R-type ferrite has a new hexagonal structure, not previously identified in hexagonal ferrites. It is otherwise known that 18H hexaferrite such as $Ba_2Zn_2TiFe_{12}O_{31}$, has a hexagonal structure with lattice parameters a=5.844 Å and c=43.020 Å, with 18 oxygen layers. It is also known that Y-type hexaferrite with chemical composition of $Ba_2Me_2Fe_{12}O_{22}$ consists entirely of sixanion-layered blocks, where the two Ba layers are adjacent. Extending these structures to the understanding of the new R-type ferrite structure, and considering the aspect where Me' is Ba, if such a block is part of the nine-layer primitive unit, the 18H unit would contain five Ba layers. Among those five Ba layers, the middle three layers likely contain a Ba atom in each of the layers. Such a unit exists as the primitive structural repeat in six-layered hexagonal $BaTiO_3$. Accordingly, and without intending to be bound by theory, it is believed that the new structure of the R-type ferrite is derived by inserting the $BaTiO_3$ layer between Ba-containing layers of the Y block (FIG. 1).

Figure 1:
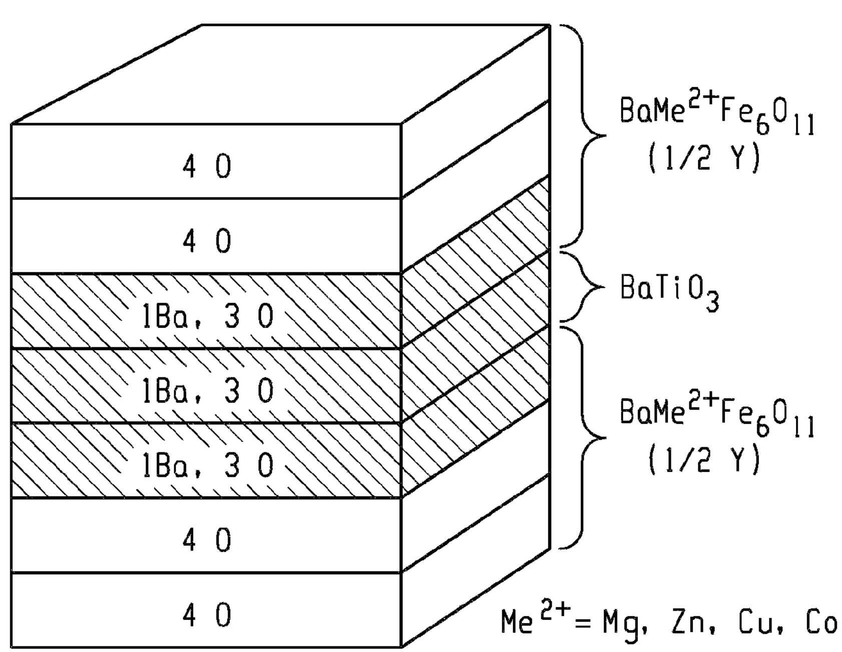
FIG. 1 is an illustration of the crystalline structure of the R-type ferrite.

FIG. 1 illustrates that the crystalline structure likely comprises 2 (TS) blocks and 2 layers of h-$BaTiO_3$, where the block diagram of one-half of the $Ba_3Me_2TiFe_{12}O_{25}$ unit cell can have 3 Y layers, 1 layer of hexagonal barium titanate (h-BTO), and 3 Y layers. It is noted that distributions of interstitial cations (not illustrated) provide path for magnetic coupling along c-axis and that the Ba can be partially or completely replaced with Sr.

The R-type ferrite can be a single crystal. The R-type ferrite can have a polycrystalline structure. Without intending to be bound by theory, it is believed that the R-type ferrite comprises two TS blocks and two layers of $BaTiO_3$.

The R-type ferrite (namely, in-plane easy magnetization) can have at least one of a high permeability (μ') a low magnetic loss tangent (tan $\delta_\mu$), a high resonance frequency, and a high figure of merit (FOM as defined by μ'/tan $\delta_\mu$). The permeability of the R-type ferrite can be greater than or equal to 2, or greater than or equal to 3, or 2 to 4, at a frequency of 1 to 3 gigahertz, or at 1 gigahertz. The magnetic loss tangent of the R-type ferrite can be less than or equal to 0.8, or less than or equal to 0.11, or 0.001 to 0.11 at a frequency of 1 to 3 gigahertz or at a frequency of 1 gigahertz. The R-type ferrite can have a permittivity of 10 to 20, or 11 to 18 at a frequency 1 to 3 gigahertz, or at 1 gigahertz. The R-type ferrite can have a low loss factor of less than or equal to 0.02, or less than or equal to 0.09 at a frequency 1 to 3 gigahertz, or at 1 gigahertz. The operating frequency of the R-type ferrite can be 1 to 3 gigahertz, or 1.5 to 3 gigahertz. A cutoff or resonance frequency ($f_r$) for the R-type hexaferrite can be greater than or equal to 3 gigahertz, or greater than or equal to 8 gigahertz, or greater than or equal to 10 gigahertz, or 10 to 20 gigahertz. The Snoek product (μ'×$f_r$) of the R-type ferrite can be greater than or equal to 10 gigahertz, or greater than or equal to 20 gigahertz, or greater than or equal to 22 gigahertz, or 20 to 25 at over the frequency range of 1 to 3 gigahertz.

In the polycrystalline ferrite, the crystalline structure of the R-type ferrite can have an average grain size of 1 to 100 micrometers, or 5 to 50 micrometers. As used herein the average grain size is measured using field emission scanning electron microscopy.

The R-type ferrite can be prepared using any suitable method. Generally, the R-type ferrite can be formed by forming a mixture comprising the precursor compounds, including oxides of at least Fe, Ti, Me, and Me'. The precursor compounds can comprise at least α-$Fe_2O_3$, $TiO_2$ or $Ti_2O_3$, $Me'_2O_3$ or $Me'CO_3$, $Co_3O_4$, and $Me_2O_3$ or MeO. The oxides can have an average particle size of 3 to 50 micrometers. The mixture can then be milled to form an oxide mixture. The milling can comprise wet milling or dry milling the oxide mixture. The milling of the precursor compounds can comprise milling for less than or equal to 3 hours, or 0.5 to 2 hours. The milling can comprise milling at a milling speed of less than or equal to 400 revolutions per minute (rpm), or 200 to 350 rpm.

The oxide mixture(s) can be calcined to form calcined ferrite(s). The calcining can occur at a calcination temperature of 800 to 1,300 degrees Celsius (° C.), or 1,000 to 1,200° C. The calcining can occur for a calcination time of 0.5 to 20 hours, 1 to 10 hours, or 2 to 5 hours. The calcining can occur in air or oxygen. The ramping temperature up to and down from the calcining temperature can each independently occur at a ramp rate of 1 to 5° C. per minute.

The calcined ferrite(s) can be ground and screened to form coarse particles. The coarse particles can be ground to a size of 0.1 to 20 micrometers, or 0.1 to 10 micrometers. The particles can be ground, for example, in a wet-planetary ball mill by mixing for 2 to 10 hours, or 4 to 8 hours at a milling speed of less than or equal to 600 rpm, or 400 to 500 rpm. The milled mixture can optionally be screened, for example, using a 10 to 300 #sieve. The milled mixture can be ground to have a particle size of 0.5 to 10 micrometers. The milled mixture can be mixed with a polymer such as poly(vinyl alcohol) to form granules. The granules can have an average particle size of 50 to 300 micrometers. The milled mixture can be formed, for example, by compressing at a pressure of 0.2 to 2 megatons per centimeter squared. The milled mixture, either particulate or formed, can be post-annealed at an annealing temperature of 900 to 1,275° C., or 1,000 to 1,300° C. The annealing can occur for 1 to 20 hours, or 5 to 12 hours. The annealing can occur in air or oxygen.

The final R-type ferrite can be in the form of particulates (for example, having a spherical or irregular shape) or in the form of platelets, whiskers, flakes, etc. A particle size of the particulate R-type ferrite can be 0.5 to 50 micrometers, or 1 to 10 micrometers. Platelets of the R-type ferrite can have an average maximum length of 0.1 to 100 micrometers and an average thickness of 0.05 to 1 micrometer.

The R-type ferrite particles can be used to make a composite, for example, comprising the R-type ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene or polyoxymethylene), poly($C_{1-6}$ alkyl)acrylates, polyacrylamides (including unsubstituted and mono-N- or di-N—($C_{1-8}$ alkyl) acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) or polyether ketone ketones (PEKK)), polyarylene ketones, polyarylene sulfides (for example, polyphenylene sulfides (PPS)), polyarylene sulfones (for example, polyethersulfones (PES) or polyphenylene sulfones (PPS)), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene (HDPE), low density polyethylene (LDPE), or linear low density polyethylene (LLDPE), polypropylenes, or their halogenated derivatives (such as polytetrafluoroethylenes), or their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers or copolymers thereof, e.g., poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl)methacrylate, acrylonitrile, vinyl acetate, allyl acetate, triallyl cyanurate, triallyl isocyanurate, or acrylamide.

The polymer can comprise at least one of a fluoropolymer (for example, polytetrafluoroethylene (PTFE)) or a polyolefin (for example, linear low density polyethylene (LLDPE) or high density polyethylene (HDPE)).

The R-type ferrite composite can comprise 5 to 95 volume percent, or 50 to 80 volume percent of the R-type ferrite based on the total volume of the R-type ferrite composite. The R-type ferrite composite can comprise 5 to 95 volume percent, or 20 to 50 volume percent of the polymer based on the total volume of the R-type ferrite composite. The R-type ferrite composite can be formed by compression molding, injection molding, reaction injection molding, laminating, extruding, calendering, casting, rolling, or the like. The composite can be free of a void space.

As used herein, the magnetic permeability of ferrite samples is measured using measured in coaxial airline by vector network analyzer (VNA) in Nicholson-Ross-Weir (NRW) method over a frequency of 0.1 to 10 GHz. The permeability is the complex permeability, whereas each of the real and imaginary components of the complex permeability stand for the relative permeability and the magnetic loss, respectively. The permittivity is the complex permittivity, whereas each of the real and imaginary components of the complex permittivity stand for the relative permittivity and the dielectric loss, respectively.

An article can comprise the R-type ferrite. The article can be an antenna or an inductor core. The article can be for use in the 0.5 to 15, or 2 to 15, or 0.5 to 10, or 0.5 to 1 gigahertz frequency range. The article comprising the polycrystalline R-type ferrite can be for use in the 0.5 to 10 gigahertz frequency range. The article comprising the composite can be for use in the 2 to 15 gigahertz frequency range. The article can be used for a variety of devices operable within the ultrahigh frequency range, such as a high frequency or microwave antenna, filter, inductor, transducer, circulator, or phase shifter. The article can be an antenna, a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, energy harvesting applications (for example, photovoltaic applications), solid-state refrigeration, data storage recording technologies, random access multi-state memory, or surveillance.

The R-type ferrite can have the formula: $Me'_3Me_2TiFe_{12}O_{25}$, wherein Me' is at least one of $Ba^{2+}$ or $Sr^{2+}$ and Me is at least one of $Co^{2+}$, $Mg^{2+}$, $Cu^{2+}$, or $Zn^{2+}$. Me' can comprise $Ba^{2+}$. The R-type ferrite can have the formula: $Ba_3Co_{2-x}Me''_xTiFe_{12}O_{25}$, wherein Me" is at least one of $Mg^{2+}$, $Cu^{2+}$, or $Zn^{2+}$ and x is 0 to 2. The R-type ferrite can be multiferroic showing ferrimagnetic and ferroelectric ordering at greater than or equal to 23° C. The R-type ferrite can have a permeability of greater than or equal to 2, or greater than or equal to 3, or 2 to 4, at a frequency of 1 to 3 gigahertz, or at 1 gigahertz. The R-type ferrite can have a magnetic loss tangent $\delta_\mu$ of less than or equal to 0.8, or less than or equal to 0.11, or 0.001 to 0.11 at a frequency of 1 to 3 gigahertz or at a frequency of 1 gigahertz. The R-type ferrite can have a Snoek product of greater than or equal to 10 gigahertz, or greater than or equal to 20 gigahertz, or greater than or equal to 22 gigahertz, or 20 to 25 at over the frequency range of 1 to 3 gigahertz.

A composite can comprise a polymer and the R-type ferrite. The polymer can comprise at least one of a fluoropolymer or a polyolefin. An article can comprise the ferrite composition or the composite. The article can be an antenna, a filter, an inductor, a circulator, or an EMI suppressor.

A method of making a R-type ferrite can comprise milling ferrite precursor compounds comprising oxides of at least Fe, Ti, Me, and Me', to form an oxide mixture; wherein Me' comprises at least one of $Ba^{2+}$ or $Sr^{2+}$; Me is at least one of $Co^{2+}$, $Mg^{2+}$, $Cu^{2+}$, or $Zn^{2+}$; and calcining the oxide mixture in an oxygen or air atmosphere to form the R-type ferrite. The milling can occur for greater than or equal to 4 hours. The milling can occur at a mixing speed of greater than or equal to 300 revolutions per minute. The method can comprise post-annealing the R-type ferrite in an oxygen or air atmosphere after the high energy milling. The post-annealing can occur at an annealing temperature of 900 to 1,275° C., or 1,000 to 1,300° C. The post-annealing can occur an annealing time of 1 to 20 hours, or 5 to 12 hours. The calcining the calcined ferrite can occur at a calcining temperature of 800 to 1,300° C., or 1,000 to 1,200° C. The calcining the calcined ferrite can occur for a calcining time of 0.5 to 20 hours, or 1 to 10 hours. A composite can be formed by mixing the R-type ferrite and a polymer.

The following examples are provided to illustrate the present disclosure. The examples are merely illustrative and are not intended to limit devices made in accordance with the disclosure to the materials, conditions, or process parameters set forth therein.

EXAMPLES

The magnetic permeability and the magnetic loss of the ferrites were measured using measured in coaxial airline by vector network analyzer (VNA) in Nicholson-Ross-Weir (NRW) method over a frequency of 0.1 to 10 GHz.

Magnetic hysteresis measurements were performed using a Vibrating Sample Magnetometer (VSM). The temperature dependence of magnetization was measured over the temperature range of 77 to 500 Kelvin.

Ferroelectric hysterias loops (P-E) were measured using a Radiant Ferroelectric Tester.

Examples 1-9: Effect of the Interstitial Cations on the R-Type Ferrite

Oxide mixtures were prepared by mixing $BaCO_3$, MgO, $Co_3O_4$, CuO, ZnO, $TiO_2$, and $Fe_2O_3$ in amounts to form the R-type hexaferrite compositions of Examples 1-9 as shown in Table 1. The oxide mixtures were mixed in a wet-plenary ball mill for two hours at 350 revolutions per minute (rpm). The mixture was then calcined at a temperature of 1,100° C. for a soak time of 4 hours in air to form the R-type ferrite compositions.

The R-type hexaferrite compositions were then crushed and screened through 40 #sieve to form coarse particles. The coarse particles were ground down to 0.5 to 10 micrometers in a wet-planetary ball mill for six hours at 450 rpm. The granulated ferrite was mixed with 0.5 to 5 wt % of poly (vinyl alcohol) and sieved in a 40 #sieve. The sieved material was then compressed at a pressure of 1 megaton per centimeters squared to form ferrite green bodies having a toroid structure with an outer diameter of 7 millimeters (mm), an inner diameter of 3 mm, and a thickness of 3 to 3.5 mm. The poly(vinyl alcohol) was burned out at 600° C. for 2 hours in air. The green body toroids were post-annealed at 1,250° C. for 4 hours in oxygen at a flow rate of 0.5 liters per minute using ramping and cooling rate of 3 degrees Celsius per minute (° C./min). The compositions of the resultant ferrite compositions had the formula $Ba_3Co_{2-x}Me''_xTiFe_{11.7}O_{25}$, where the values of x are shown in Table 1.

Figure 2:
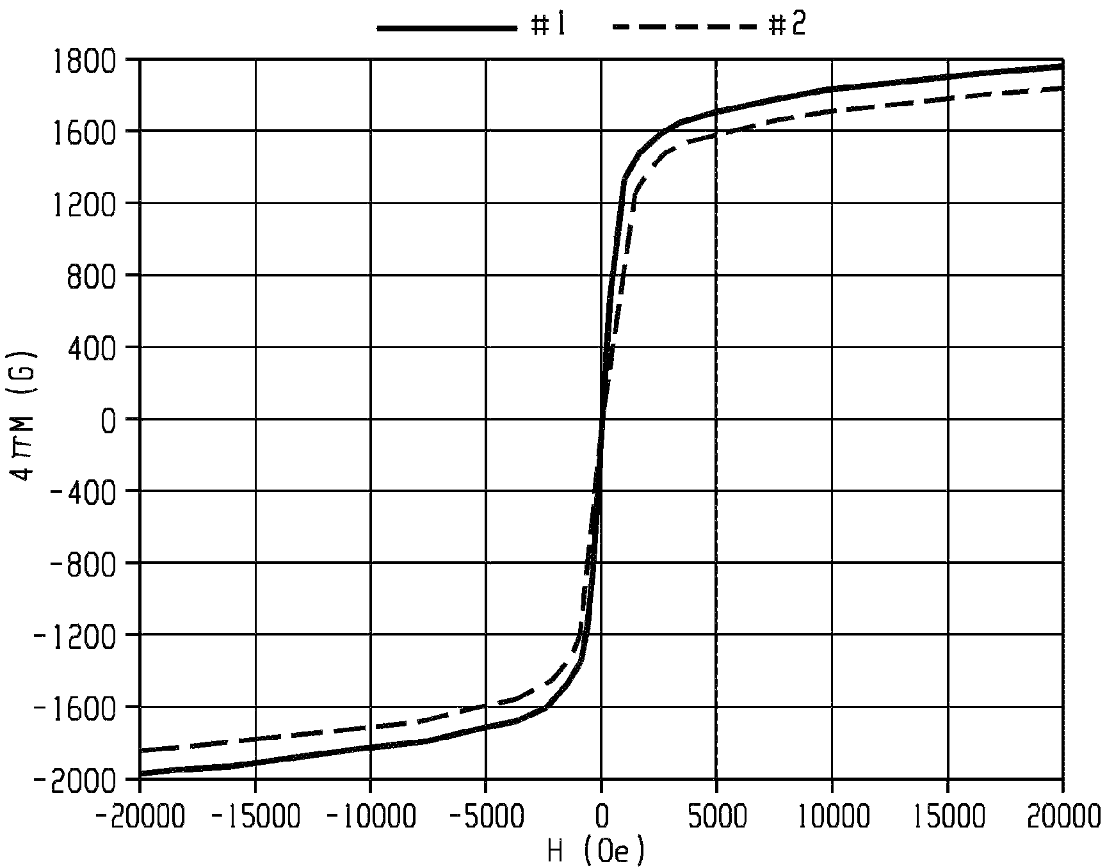
FIG. 2 is a graphical illustration of the magnetization with field strength of Examples 1 and 2.
Figures 3, 4:
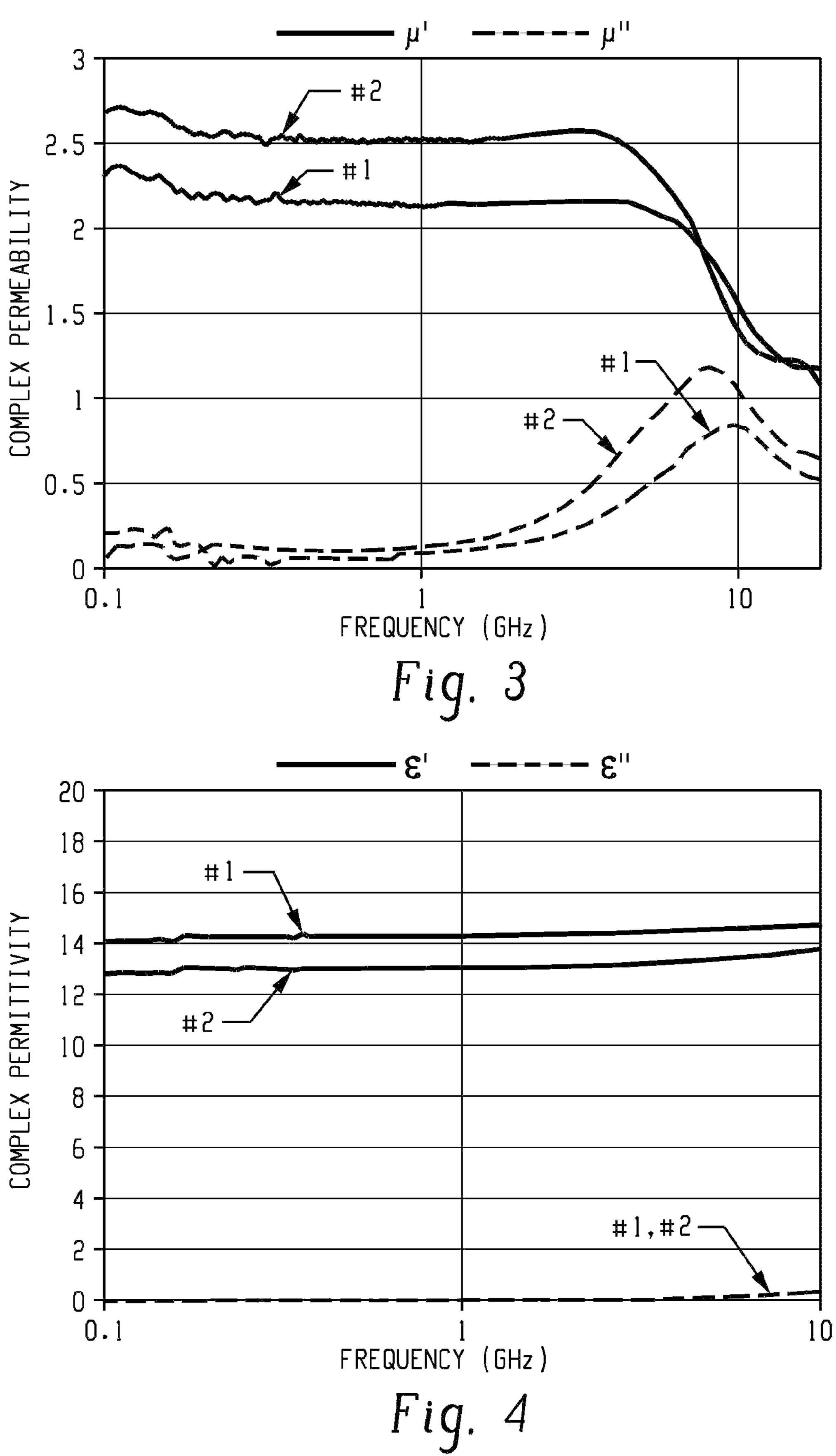
FIG. 3 is a graphical illustration of the magnetic properties of the compositions of Examples 1 and 2.
FIG. 4 is a graphical illustration of the dielectric properties of the compositions of Examples 1 and 2.
Figures 5, 6:
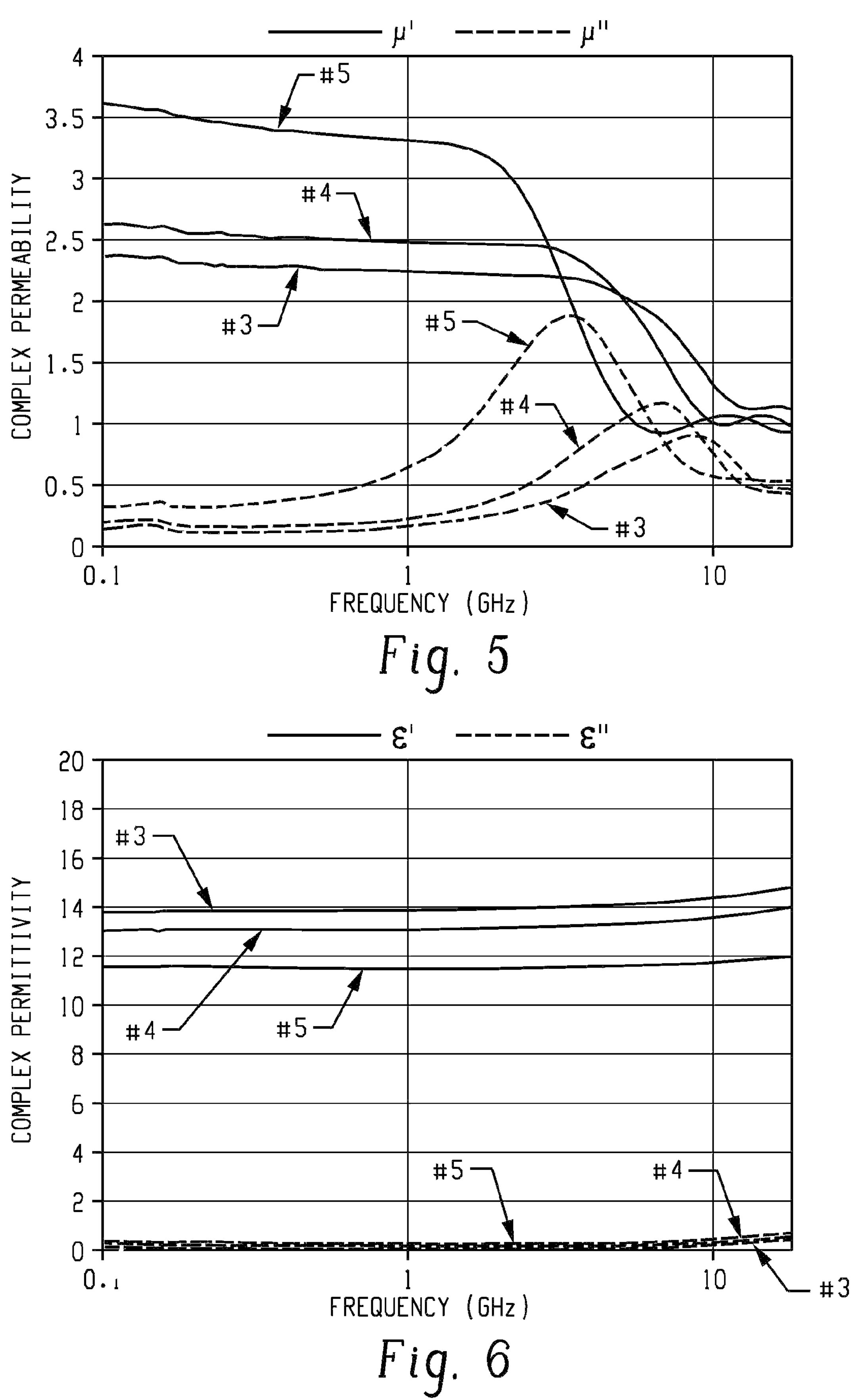
FIG. 5 is a graphical illustration of the magnetic properties of the compositions of Examples 3-5.
FIG. 6 is a graphical illustration of the dielectric properties of the compositions of Examples 3-5.
Figures 7, 8:
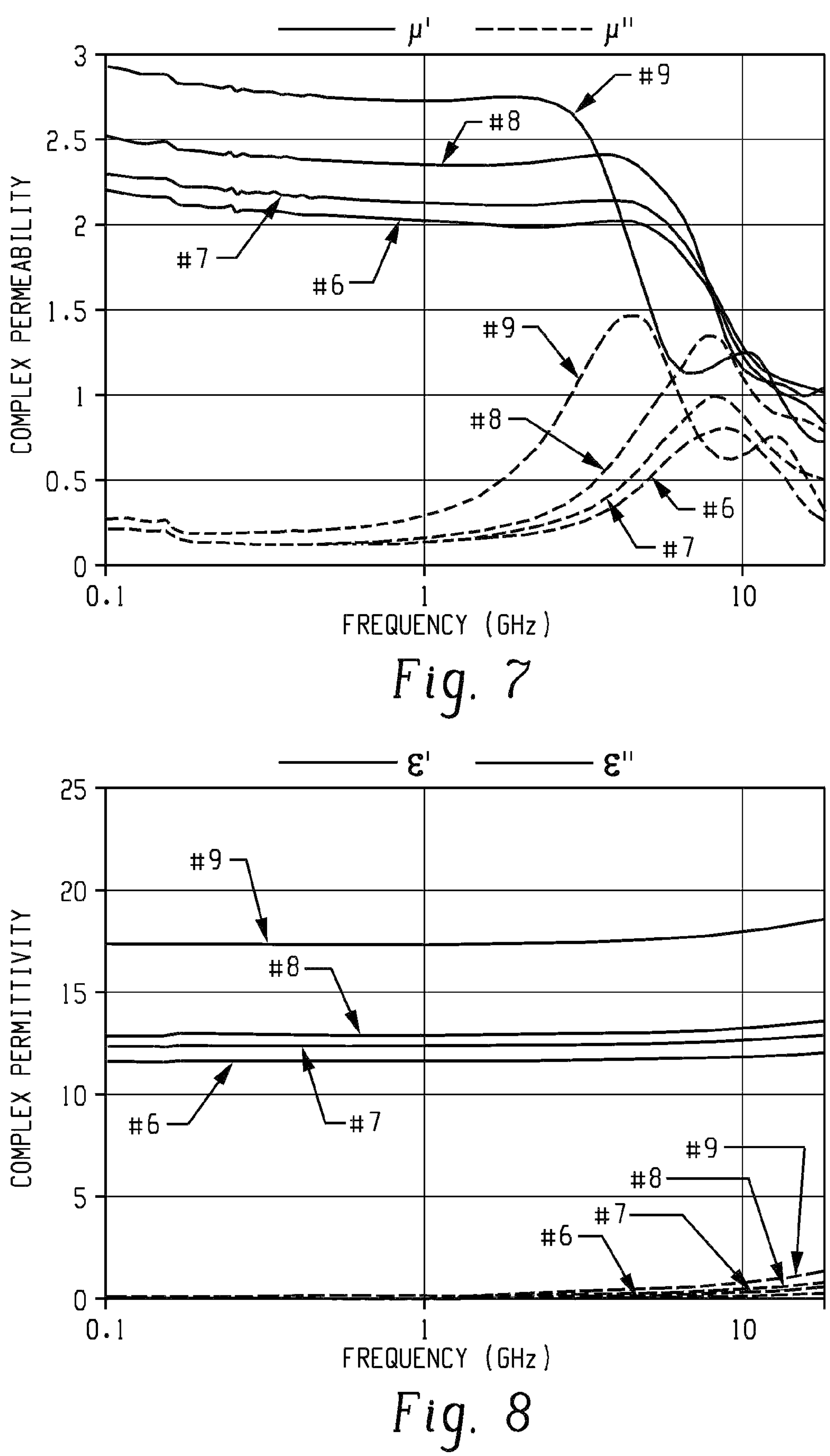
FIG. 7 is a graphical illustration of the magnetic properties of the compositions of Examples 6-9.
FIG. 8 is a graphical illustration of the dielectric properties of the compositions of Examples 6-9.

The magnetic hysteresis was measured for the polycrystalline ferrites of Examples 1 and 2 and the results are shown in FIG. 2, where the field strength H is in Oersted (Oe) and the magnetization M is measured in gauss (G). FIG. 2 shows that the maximum magnetization of Examples 1 and 2 are 1962 G and 1824 G, respectively, and that the field strength at a magnetization of 0 is 64.5 and 73.0, respectively.

Figure 11:
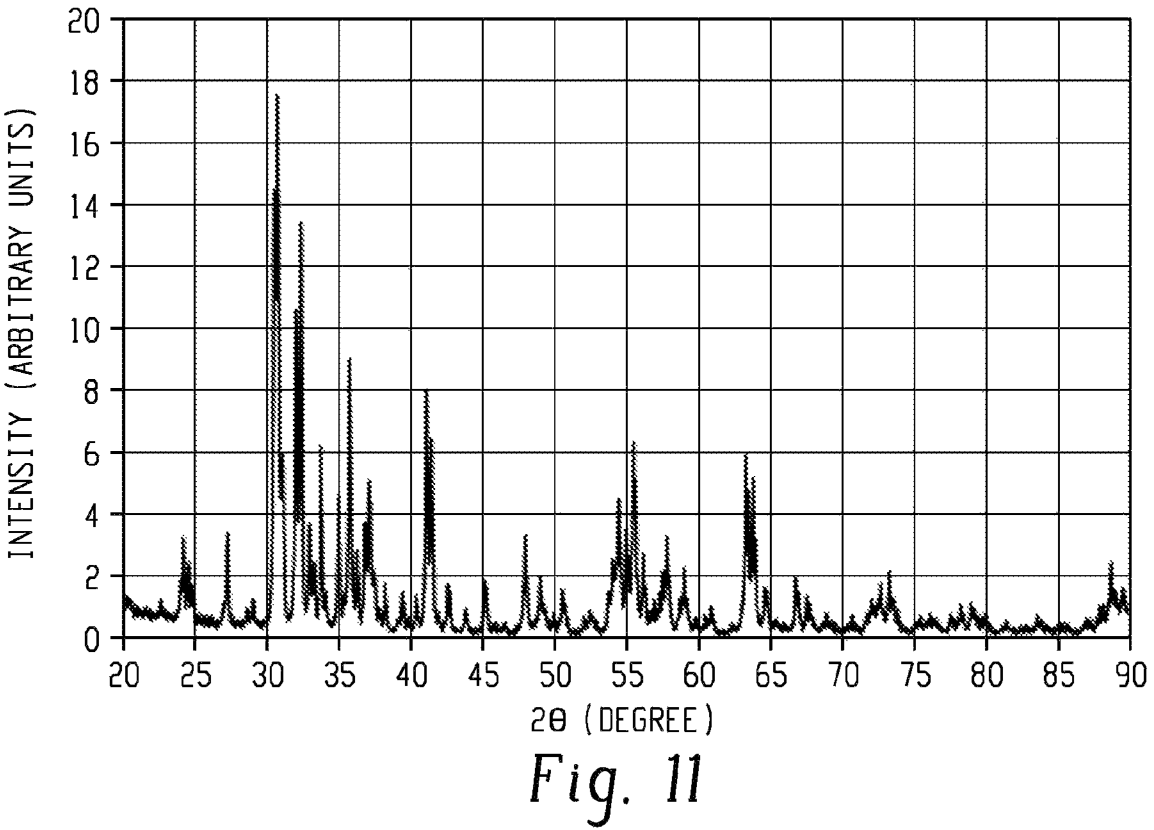
FIG. 11 is a graphical illustration of the x-ray diffraction data of Example 1.

X-ray diffraction was used to analyze the R-type ferrite of Example 1. The results are shown in FIG. 11. The data can be indexed to determine the hexagonal crystal structure.

The magnetic and dielectric properties of the compositions were determined and shown in FIGS. 3-8 and values of the permeability and the permittivity at 1.0 GHz, 2.0 GHz, and 3.0 GHz are shown in Table 1. The resonance frequency and the Snoek product (SP) were also measured and are shown in Table 1 for Examples 1-9.

TABLE 1

| Example | 1 | 2 | 3 | 4 | 5 | 6 | 7 | 8 | 9 |
|---|---|---|---|---|---|---|---|---|---|
| x | 0 | 0.25 | 0.25 | 0.5 | 1 | 0.1 | 0.25 | 0.5 | 1 |
| Me" | — | Zn | Mg | Mg | Mg | Cu | Cu | Cu | Cu |
| $f_r$ (GHz) | 9.8 | 8.0 | 8.7 | 6.8 | 3.4 | 8.8 | 8.2 | 7.8 | 4.5 |
| SP (GHz) | 22.5 | 21.6 | 20.9 | 17.7 | 12.2 | 19.4 | 18.9 | 19.5 | 13.1 |
| Frequency of 1.0 GHz | | | | | | | | | |
| μ' | 2.15 | 2.52 | 2.24 | 2.48 | 3.32 | 2.02 | 2.13 | 2.35 | 2.73 |
| $\tan\delta_\mu$ | 0.05 | 0.06 | 0.07 | 0.09 | 0.19 | 0.07 | 0.07 | 0.07 | 0.11 |
| ∈' | 14.3 | 13.1 | 13.8 | 13.1 | 11.5 | 11.6 | 12.3 | 12.8 | 17.2 |
| $\tan\delta_\epsilon$ | 0.002 | 0.003 | 0.0009 | 0.001 | 0.009 | 0.002 | 0.002 | 0.003 | 0.008 |
| Frequency of 2.0 GHz | | | | | | | | | |
| μ' | 2.15 | 2.57 | 2.21 | 2.47 | 3.1 | 2 | 2.12 | 2.36 | 2.75 |
| $\tan\delta_\mu$ | 0.07 | 0.09 | 0.11 | 0.16 | 0.42 | 0.09 | 0.09 | 0.1 | 0.21 |
| ∈' | 14.4 | 13.2 | 13.9 | 13.1 | 11.5 | 11.6 | 12.3 | 12.9 | 17.3 |
| $\tan\delta_\epsilon$ | 0.004 | 0.004 | 0.002 | 0.002 | 0.01 | 0.003 | 0.003 | 0.005 | 0.009 |
| Frequency of 3.0 GHz | | | | | | | | | |
| μ' | 2.16 | 2.57 | 2.2 | 2.43 | 2.38 | 2.01 | 2.14 | 2.4 | 2.63 |
| $\tan\delta_\mu$ | 0.11 | 0.16 | 0.16 | 0.26 | 0.77 | 0.12 | 0.13 | 0.17 | 0.4 |
| ∈' | 14.5 | 13.3 | 14 | 13.2 | 11.5 | 11.6 | 12.4 | 12.9 | 17.4 |
| $\tan\delta_\epsilon$ | 0.008 | 0.007 | 0.006 | 0.006 | 0.02 | 0.004 | 0.005 | 0.009 | 0.02 |

Table 1 shows that varying the type and amount of the interstitial cation can tune the permeability and the permittivity while maintaining low magnetic and dielectric losses.

Figure 9:
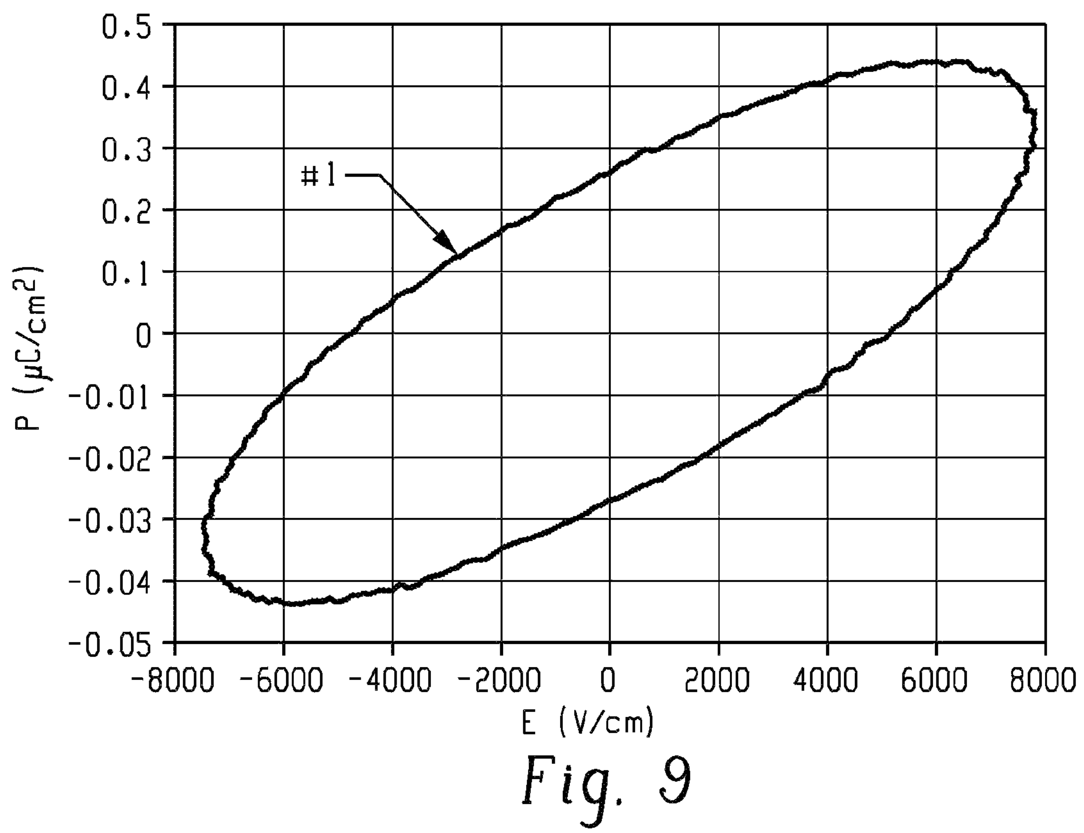
FIG. 9 is a graphical illustration of the electric field dependence of polarization at room temperature of Example 1.
Figure 10:
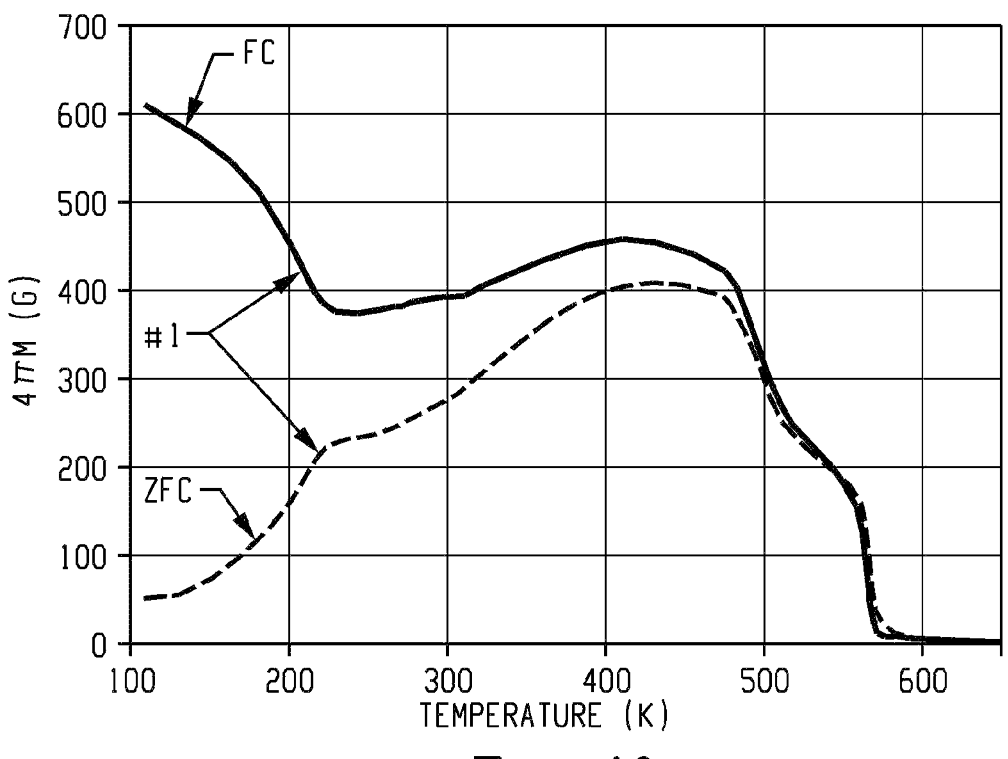
FIG. 10 is a graphical illustration of the temperature dependence of magnetization for R-type hexaferrite of Example 1.

The electric field dependence of polarization at room temperature and the temperature dependence of magnetization for R-type hexaferrite of Example 1 are shown in FIG. 9 and FIG. 10, respectively. FC and ZFC denote field-cooling and zero field cooling. This data demonstrates that the R-type ferrite exhibits ferrimagnetism and ferroelectricity simultaneously at room temperature.

Set forth below are non-limiting aspects of the present disclosure.

Aspect 1: An R-type ferrite, having the formula: $Me'_3Me_2TiFe_{12}O_{25}$, wherein Me' is at least one of $Ba^{2+}$ or $Sr^{2+}$ and Me is at least one of $Co^{2+}$, $Mg^{2+}$, $Cu^{2+}$, or $Zn^{2+}$.

Aspect 2: The R-type ferrite of Aspect 1, wherein the Me' comprises $Ba^{2+}$.

Aspect 3: The R-type ferrite of any of the preceding aspects, wherein the R-type ferrite has the formula: $Ba_3Co_{2-x}Me''_xTiFe_{12}O_{25}$, wherein Me" is at least one of $Mg^{2+}$, $Cu^{2+}$, or $Zn^{2+}$ and x is 0 to 2.

Aspect 4: The R-type ferrite of any of the preceding aspects, wherein the R-type ferrite is multiferroic showing ferrimagnetic and ferroelectric ordering at greater than or equal to 23° C.

Aspect 5: The R-type ferrite of any of the preceding aspects, wherein the R-type ferrite has a permeability of greater than or equal to 2, or greater than or equal to 3, or 2 to 4, at a frequency of 1 to 3 gigahertz, or at 1 gigahertz.

Aspect 6: The R-type ferrite of any of the preceding aspects, wherein the R-type ferrite has a magnetic loss tangent tan $\delta_\mu$ of less than or equal to 0.8, or less than or equal to 0.11, or 0.001 to 0.11 at a frequency of 1 to 3 gigahertz or at a frequency of 1 gigahertz.

Aspect 7: The R-type ferrite of any of the preceding aspects, wherein the R-type ferrite has a Snoek product of greater than or equal to 10 gigahertz, or greater than or equal to 20 gigahertz, or greater than or equal to 22 gigahertz, or 20 to 25 at over the frequency range of 1 to 3 gigahertz.

Aspect 8: A composite comprising a polymer and the R-type ferrite of any of the preceding aspects.

Aspect 9: The composite of Aspect 8, wherein the polymer comprises at least one of a fluoropolymer or a polyolefin.

Aspect 10: An article comprising the ferrite composition of any of Aspects 1 to 7 or the composite of any one of Aspects 8 to 9.

Aspect 11: The article of Aspect 10, wherein the article is an antenna, a filter, an inductor, a circulator, or an EMI suppressor.

Aspect 12: A method of making a R-type ferrite (optionally of any of Aspects 1 to 7) comprising: milling ferrite precursor compounds comprising oxides of at least Fe, Ti, Me, and Me', to form an oxide mixture; wherein Me' comprises at least one of $Ba^{2+}$ or $Sr^{2+}$; Me is at least one of $Co^{2+}$, $Mg^{2+}$, $Cu^{2+}$, or $Zn^{2+}$; and calcining the oxide mixture in an oxygen or air atmosphere to form the R-type ferrite.

Aspect 13: The method of Aspect 12, wherein the milling occurs for greater than or equal to 4 hours; or at a mixing speed of greater than or equal to 300 revolutions per minute.

Aspect 14: The method of any of Aspects 12 to 13, further comprising post-annealing the R-type ferrite in an oxygen or air atmosphere after the high energy milling; wherein the post-annealing occurs at an annealing temperature of 900 to 1,275° C., or 1,000 to 1,300° C. for an annealing time of 1 to 20 hours, or 5 to 12 hours.

Aspect 15: The method of any of Aspects 12 to 14, wherein the calcining the calcined ferrite occurs at a calcining temperature of 800 to 1,300° C., or 1,000 to 1,200° C. for a calcining time of 0.5 to 20 hours, or 1 to 10 hours.

Aspect 16: The method of any of Aspects 12 to 15, further comprising forming a composite comprising the R-type ferrite and a polymer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A ferrite, having the formula:

$$Me'_3Me_2TiFe_{12}O_{25}$$

and comprising a $Me'TiO_3$ layer between two $Me'MeFe_6O_{11}$ layers, wherein Me' is at least one of $Ba^{2+}$ or $Sr^{2+}$ and Me is at least one of $Co^{2+}$, $Mg^{2+}$, $Cu^{2+}$, or $Zn^{2+}$.

2. The ferrite of claim 1, wherein the Me' comprises $Ba^{2+}$.

3. The ferrite of claim 1, wherein the ferrite has the formula:

$$Ba_3Co_{2-x}Me''_xTiFe_{12}O_{25}$$

wherein Me" is at least one of $Mg^{2+}$, $Cu^{2+}$, or $Zn^{2+}$ and x is 0 to 2.

4. The ferrite of claim 1, wherein the ferrite is multiferroic showing ferrimagnetic and ferroelectric ordering at greater than or equal to 23° C.

5. The ferrite of claim 1, wherein the ferrite has a permeability of greater than or equal to 2 at a frequency of 1 to 3 gigahertz.

6. The ferrite of claim 1, wherein the ferrite has a magnetic loss tangent tan $\delta_\mu$ of less than or equal to 0.8 at a frequency of 1 to 3 gigahertz.

7. The ferrite of claim 1, wherein the ferrite has a Snoek product of greater than or equal to 10 gigahertz over the frequency range of 1 to 3 gigahertz.

8. A composite comprising a polymer and the ferrite of claim 1.

9. The composite of claim 8, wherein the polymer comprises at least one of a fluoropolymer or a polyolefin.

10. An article comprising the ferrite of claim 1.

11. The article of claim 10, wherein the article is an antenna, a filter, an inductor, a circulator, or an EMI suppressor.

12. A method of making the ferrite of claim 1, the method comprising:

milling ferrite precursor compounds comprising oxides of at least Fe, Ti, Me, and Me', to form an oxide mixture; wherein Me' comprises at least one of $Ba^{2+}$ or $Sr^{2+}$; Me is at least one of $Co^{2+}$, $Mg^{2+}$, $Cu^{2+}$, or $Zn^{2+}$; and calcining the oxide mixture in an oxygen or air atmosphere to form the ferrite.

13. The method of claim 12, wherein the milling occurs for greater than or equal to 4 hours; or at a mixing speed of greater than or equal to 300 revolutions per minute;

the calcining the calcined ferrite occurs at a calcining temperature of 800 to 1,300° C. for a calcining time of 0.5 to 20 hours; or a combination thereof.

14. The method of claim 12, further comprising post-annealing the ferrite in an oxygen or air atmosphere after the high energy milling; wherein the post-annealing occurs at an annealing temperature of 900 to 1,275° C. for an annealing time of 1 to 20 hours;

forming a composite comprising the ferrite and a polymer; or a combination thereof.

15. A hexagonal or crystalline structure ferrite having the formula:

$$Me'_3Me_2TiFe_{12}O_{25}$$

wherein Me' is at least one of $Ba^{2+}$ or $Sr^{2+}$ and Me is at least one of $Co^{2+}$, $Mg^{2+}$, $Cu^{2+}$, or $Zn^{2+}$.

16. A polycrystalline structure ferrite having the formula:

$$Me'_3Me_2TiFe_{12}O_{25}$$

wherein Me' is at least one of $Ba^{2+}$ or $Sr^{2+}$ and Me is at least one of $Co^{2+}$, $Mg^{2+}$, $Cu^{2+}$, or $Zn^{2+}$.

17. The hexagonal or crystalline structure ferrite of claim 15, wherein the hexagonal or crystalline structure ferrite is a hexagonal structure ferrite.

18. The hexagonal or crystalline structure ferrite of claim 15, wherein the hexagonal or crystalline structure ferrite is a crystalline structure ferrite.

19. The method of claim 16, wherein the crystalline structure of the polycrystalline structure ferrite has an average grain size of 1 to 100 micrometers.

20. The method of claim 19, wherein the crystalline structure has an average grain size of 5 to 50 micrometers.

* * * * *